United States Patent Office 2,747,656
Patented May 29, 1956

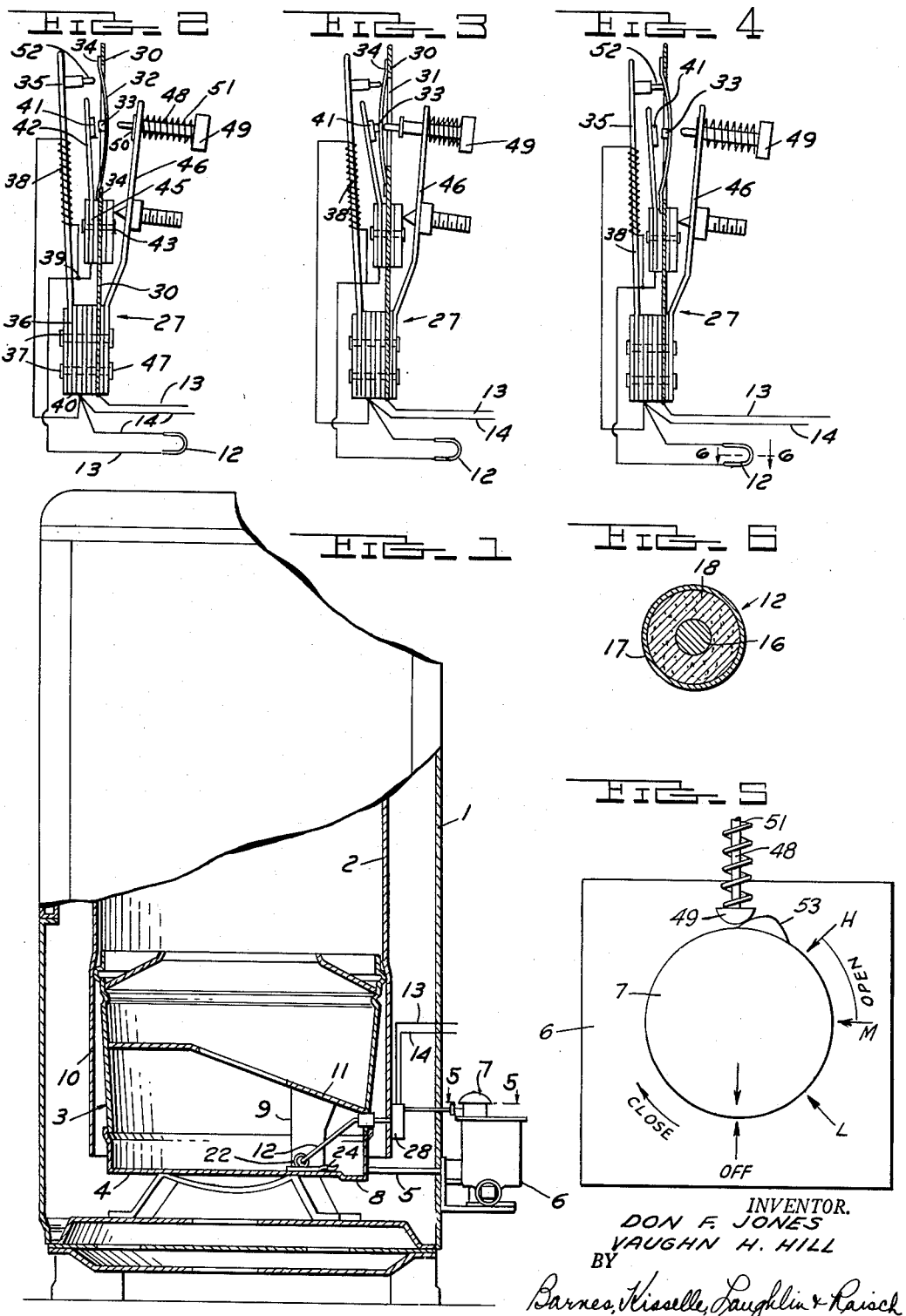

2,747,656

ELECTRIC IGNITION SYSTEM FOR AN OIL BURNER

Don F. Jones and Vaughn H. Hill, Lansing, Mich., assignors to Motor Wheel Corporation, Lansing, Mich., a corporation of Michigan Application April 9, 1951, Serial No. 219,904

10 Claims. (Cl. 158—28)

This invention relates to an electric ignition system for an oil burner and more particularly to an electric ignition device for a vaporizing pot type burner.

It is an object of this invention to produce an electric ignition system for a vaporizing type oil burner which is extremely simple in structure, efficient in operation, and which will operate with a minimum amount of care and automatically turn itself off.

The invention also contemplates an electric ignition system for a vaporizing type oil burner which is safe to operate and is arranged so that it cannot ignite the fuel unless the burner temperature is such that the burner can be safely ignited.

Fig. 1 is a cross-sectional view of a vaporizing pot type burner provided with an electric ignition system which is the subject of this invention.

Figs. 2, 3 and 4 are circuit diagrams of the instant electric ignition system showing the manual reset thermal timer in different operative positions.

Fig. 5 is a section along the line 5—5 of Fig. 1.

Fig. 6 is a section along the line 6—6 of Fig. 4.

In Fig. 1 there is shown a space heater comprising an outer casing 1 and an inner casing or radiator 2 forming a combustion chamber for a vaporizing type burner 3 of the type shown in the Miller et al. Patent 2,448,148. Oil is supplied to the base 4 of the burner through fuel line 5 provided with a constant level oil control 6 including a manually actuated valve 7. The base 4 of the burner is provided with a sump 8 adjacent the inlet of the oil feed line 5. A pilot stabilizer comprises the side walls 9 and the top wall 11, all as shown in the Miller et al. patent. The skirt surrounding the burner is designated 10.

The igniter unit consists of an electrical heating element 12 which can be any kind of an electrical resistance element but preferably is of the "Calrod" type; namely, the resistance wire element 16 is encased in a metal tube 17 and insulated therefrom by any suitable insulating material 18, such as magnesium oxide. The heating element 12 can be positioned anywhere within the burner but preferably the heating element 12 is positioned within the pilot stabilizer 9, 11 as shown. The heating element 12 is positioned above the bottom floor of the burner and preferably extends down to within one-half inch of the bottom of the burner but may extend to the bottom of the burner.

The element 12 when placed in circuit with the source of current, heats to a bright red heat and this element should be positioned above the burner bottom 4 a distance about level with the top surface of the oil in the float type oil control 6. Thus, in case the oil floods the bottom of the burner 3, the heating element 12 if positioned about one-half inch above the bottom of the burner will be positioned slightly above the top surface of the oil and not immersed therein. If the heater element 12 should be immersed in the oil as it will be if placed on the bottom of the burner and the burner floods, the oil would cool down the heating element and seriously impair the ability of the heating element to ignite the oil. The oil control 6 is of the float type and the oil in the burner 3 can never flood to a higher level than the level of the oil in the float actuated control 6.

An asbestos wick 22 is wrapped around the heating element 12 and has legs 24 which extend downwardly and rest upon the bottom 4 of the burner. This wicking draws the oil upwardly by capillary attraction and the heating element 12 ignites it. The wick 22 is preferred because it cuts down the time for the igniter to ignite the oil, but the igniter will ignite the oil in the absence of the wick 22. The heater element 12 is preferably insulated from the wall of the burner 3 in the openings through which the legs of the element pass.

In the form of invention shown in Figs. 1 through 4 the heating element 12 is connected with a source of electricity such, for example, as a 110 volt electrical circuit by lines 13 and 14 and a manual reset thermal timer generally designated 27 is located in the circuit between the source of electrical current and the heating element 12. The manual reset thermal timer is preferably located within a metal housing 28. Housing 28 can be mounted in any location where it is influenced by the temperature of the burner because switch 27 is arranged to function in response to the temperature of the burner so that it stops the electricity from flowing through the heating circuit 12, 13, 14 until the temperature of the burner has reached a predetermined temperature at which it is safe to ignite the fuel in the burner without explosion, and when the temperature of the burner is below a safe temperature, switch 27 is placed in a condition so that upon manual actuation current will flow through the igniter circuit.

As a practical matter it is possible to mount the manual reset thermal timer anywhere on the skirt 10 of the combustion chamber. If desired the thermal timer 27 can be mounted directly on the burner side wall. In actual operation the temperature of the side wall of the burner 3 will range from about 350° F. to 415° F. under different rates of oil flow burning and the skirt 10 of the heat chamber adjacent the burner will have a temperature range of from about 220° F. to 355° F. depending upon the rate at which the oil is burned in the burner. Since the temperature of the skirt 10 of the heat chamber varies in direct relation to the temperature of the side wall of the burner and since the skirt temperatures are somewhat lower than the side wall of the burner, it is preferred to mount the switch 27 on the skirt 10.

The manual reset thermal timer 27 comprises a metal frame member 30 which has an opening 31 therein which is bridged by a snap-over-center type spring 32 which carries a contact point 33. Spring 32 is riveted or otherwise affixed at each end to frame 30 as at 34. An element 35 in the form of a strip of thermostatic laminated bimetal is anchored at one end 36 by means of rivets 37 to the end of frame 30. An electrical heating coil 38 is wrapped around, and insulated from, strip 35 and is connected into line 13 as at 39 and into line 14 as at 40. In other words, resistance element 38 is in shunted relation with leads 13, 14 of resistance element 12 so that current flows through resistance element 38 only when it is flowing through heating element 12. Contact 41 is mounted upon spring metal arm 42 which is anchored at one end to frame 30 by rivet 43. Spring 42 is electrically insulated from frame 30 by insulation 45. A rigid metal arm 46 is secured to frame 30 by rivets 47 and is provided with a push button 48 having an enlarged head 49 on one side of arm 46 and an annular flange 50 on the other side of arm 46. A compression spring 51 normally holds the push button 49 in retracted position with annular flange 50 against arm 46. Arm 46 is electrically insulated from frame 30.

The operation of the instant igniter is as follows:

Assuming that the burner is cold, that is, at a temperature sufficiently low so that ignition of the fuel in the burner will not cause an explosion, then the position of the elements of the manual reset thermal timer 27 will be as indicated in Fig. 2. It is safe to light the burner whenever either the skirt 10 or the side wall of the burner 3 is at a temperature of about 120° F. or lower. Now assuming that the oil control 7 has been turned on to supply oil to the base 4 of burner 3, then button 49 is manually pressed inwardly or toward the left, Fig. 3, to snap spring 32 and contact 33 from the position indicated in Fig. 2 wherein contacts 33 and 41 are separated to the over-center position indicated in Fig. 3 where contacts 41 and 33 are in electrical contact one with the other. Current now flows from the source of electricity through heating element 12 through a circuit made up of the following elements: line 13, frame 30, spring 32, contacts 33 and 41, spring 42, line 13, element 12 and line 14. Since a flow of electricity through element 12 has been established, current now also flows through resistance element 38 which heats bimetal element 35 and causes it to bend or flex clockwise as viewed in Fig. 2 from the position shown in Fig. 2 to that shown in Fig. 4. Element 35 is provided with an abutment 52 of insulating material which, when element 35 has flexed sufficiently to the right, presses against over-center spring 32 and causes it to snap from the position shown in Fig. 3 to that shown in Fig. 4 where contacts 33 and 41 are separated, and the flow of current through heating element 12 and resistance element 38 is interrupted. The heating element 12 needs to reach an outside surface temperature of about 1300° F. to properly ignite the fuel. It should reach this temperature in preferably two minutes which should light or ignite the oil within a four minute period. The watt density per inch of length of element 12 should be within a range of from about fifty to sixty watts because this insures the temperatures of element 12 reaching 1300° F. in the two minute period. Using this low watt density per inch of heating element 12 insures a long life for said element.

As soon as the oil in the burner 3 is ignited and a fire established, the temperature of the burner will rise, as above specified, and depending upon whether the fire is low or high or intermediate the temperature of the skirt will range from about 220° F. to 355° F. The bimetal element 35 will be influenced or heated by the heat radiating from the burner. If the burner is at a temperature of about 120° F. or higher, then the heat input into bimetal element 35 will be sufficient to cause it to flex to the position shown in Fig. 4 where it maintains the snap switch 32, 33 in off position so that no current is flowing through element 12. If while the burner 3 is at a temperature of about 120° F. or higher, the button 49 is pushed inwardly or toward the left, contacts 33 and 41 can be brought together but the instant that pressure is removed from button 49 spring 48 will retract button 49 to the position shown in Fig. 4 and contacts 41, 33 will immediately separate to break the contact. This situation obtains because bimetal element 35 will be flexed to the right, Fig. 4, where it biases snap-over-center spring 32 carrying contact 33 to the off position. As soon as the temperature of the burner drops below 120° F., bimetal element 35 will flex to the left or its cold position, Fig. 2, removing the bias on spring 32 and allowing it to assume the position shown in Fig. 3 on being manually flexed by push button 48.

As shown in Fig. 5, push button 48, 49 can be operated off the oil control valve handle 7. As shown, handle 7 is provided with a cam 53 which, when the valve is in the off position, shown in Fig. 5, permits button 49 to be fully retracted by its spring 51. When the oil is turned on, cam 53 moves button 48 inwardly or to the left to set the timer switch 27 in the "on" position, shown in Fig. 3. Cam 53 rides beyond button 49 by the time the oil valve is turned into low fire position and thus permits the spring 51 to retract button 49.

It will be noted that the electrical circuit for the heating element has incorporated therein both a timer switch and a temperature responsive switch, the timer switch cutting off the current to the heating element 12 after a predetermined time delay and the temperature responsive switch cutting off the current to the heating element 12 whenever the fire pot is above a predetermined temperature at which ignition of the mixture in the burner would cause an explosion. In Figs. 1 to 4, the timer switch comprises essentially the bimetal bar 35, heating element 38 and switch element 32, 33 and 41. In Figs. 1 to 4 the temperature responsive switch is a part of the timer switch.

We claim:

1. In a heater having a vaporizing pot type burner, an electrical ignition system for the burner comprising a source of electricity, an electrical resistance heating element positioned in the burner, a temperature responsive element, a second electrical resistance element in heat exchange relation to said temperature responsive element, switch contacts arranged to be closed manually for completing a circuit through the heating element in the burner and a circuit through said second heating element, said two circuits being in shunt relation to each other, said temperature responsive element when heated by the second heating element being operative to open said manually closed switch within a predetermined time interval, said temperature responsive element also being in heat exchange relation with said burner and effective to hold said manually closable switch contacts open whenever the burner is at or above a temperature at which it can be safely ignited.

2. In a heater of the type having a vaporizing pot type burner, an electrical ignition system for the burner comprising an electrical resistance heating element positioned in the burner, an electrical circuit including a manually closable switch in series with said heating element, temperature responsive means including a bimetallic element positioned in heat influence relation with said burner and responding to burner heat at temperatures above a predetermined temperature at or below which the burner can be safely ignited for holding said switch open, and timing means including said bimetallic element and a heater for opening said switch a predetermined time after said switch has been manually closed and the electrical circuit established through said heating element.

3. The electrical ignition system defined in claim 2 wherein said heater comprises a second electrical resistance heating element in said circuit in shunt relation with said first mentioned heating element in the burner, said second heating element being positioned in heat transfer relation with said temperature responsive means for heating the same when a circuit is completed through said first mentioned heating element.

4. In a heater of the type having a vaporizing pot type burner, an electrical ignition system comprising an electrical resistance heating element positioned in the burner, an electrical circuit including a switch for opening and closing the circuit to said heating element, said switch including a bimetallic element positioned in heat influence relation to the burner, a fixed contact, a spring contact member movable in opposite directions to make and break with said fixed contact to open and close the circuit through said heating element, an electrical resistance heating element in said circuit adapted to heat said bimetallic element, said bimetallic element being constructed and arranged to engage and thereby flex said spring contact member in a direction to open said circuit whenever the temperature exceeds that at which the burner can be safely ignited but being incapable of flexing said spring contact member to a position closing said circuit whenever the temperature is at or above that at which the burner can be safely ignited, and independent means for closing said switch.

5. The electrical ignition system defined in claim 4 wherein said last mentioned means comprises a manually actuated reset member engageable with said spring for flexing said spring to a position closing with said fixed contact.

6. The combination defined in claim 5 wherein said spring contact member is of the snap-over-center type.

7. The combination set forth in claim 6 including means resiliently biasing said manually actuated reset member in one direction, said reset member being movable in the opposite direction to engage with said spring for closing said circuit, said bimetallic element being arranged to resiliently bias said spring over center to the position opening said circuit whenever the temperature exceeds that at which the burner can be safely ignited whereby when the temperature exceeds that at which the burner can be safely ignited and said reset member is actuated to close said circuit and then released, said bimetallic element retains said spring in the position opening said circuit.

8. In a heater of the type having a vaporizing pot type burner, an electrical ignition system comprising an electrical resistance heating element positioned in the burner, an electrical circuit including a switch for opening and closing the circuit to said heating element, said switch including a fixed contact, a leaf spring contact movable in opposite directions with a snap action to make and break with the said fixed contact to close and open the circuit through said heating element, a bimetallic element positioned in heat influence relation to the burner, said bimetallic element being arranged to abut against one side of and flex said leaf spring contact in a direction to break with the fixed contact whenever the temperature exceeds that at which the burner can be safely ignited but being ineffective to flex said spring contact towards said fixed contact, a manual reset member arranged to abut against the opposite side of and flex said leaf spring contact in a direction to make with the fixed contact to hereby close the circuit through the heating element and an electrical resistance heating element in circuit with said first heating element and adapted to heat said bimetallic element.

9. The combination called for in claim 8 including an oil control having a manually operable valve for controlling the admission of fuel to the burner and means on said oil control responsive to the manual operation of said valve in the opening direction for actuating said manually operable reset member to flex said leaf spring contact in a direction to make with said fixed contact.

10. In a heater having a vaporizing type burner provided with an oil control having a manually operable valve for supplying oil to said burner, an electrical ignition system comprising a resistance heating element positioned in the burner, and an electrical circuit including a time and temperature responsive switch in series with said heating element, said switch including a bimetallic element and heater therefor, said bimetallic element being positioned in heat influence relation with the burner and responding to burner heat at temperatures above a predetermined temperature at or below which the burner may be safely ignited for holding said switch open, means on said oil control valve for closing said switch, said bimetallic element being responsive to the heat of said heater and said burner to open said circuit automatically after a predetermined length of time and also whenever the burner is at or above said temperature at which it can be safely ignited.

References Cited in the file of this patent

UNITED STATES PATENTS

| | | |
|---|---|---|
| 1,594,020 | Smith | July 27, 1926 |
| 1,673,404 | D'Arche | June 12, 1928 |
| 1,985,991 | Harrington | Jan 1, 1935 |
| 2,239,175 | Unser | Apr. 22, 1941 |
| 2,399,673 | Hall | May 7, 1946 |
| 2,401,393 | Wakefield | June 4, 1946 |
| 2,416,766 | Miller et al. | Mar. 4, 1947 |
| 2,438,275 | Fell et al. | Mar. 23, 1948 |
| 2,500,663 | Cleveland | Mar. 14, 1950 |
| 2,601,892 | Hall | July 1, 1952 |
| 2,656,883 | Miller et al. | Oct. 27, 1953 |
| 2,659,428 | Judson | Nov. 17, 1953 |

FOREIGN PATENTS

| | | |
|---|---|---|
| 511,731 | Germany | Nov. 5, 1930 |